(12) United States Patent
Unru et al.

(10) Patent No.: US 10,186,966 B2
(45) Date of Patent: Jan. 22, 2019

(54) PHOTOVOLTAIC INVERTER COMPRISING AN UPSTREAM DC/DC CONVERTER AND TEMPERATURE REGULATION OF THE POWER SEMICONDUCTORS

(71) Applicant: SMA Solar Technology AG, Niestetal (DE)

(72) Inventors: Alexander Unru, Baunatal (DE); Martin Bock, Frankenau (DE)

(73) Assignee: SMA Solar Technology AG, Niestetal (DE)

( * ) Notice: Subject to any disclaimer, the term of this patent is extended or adjusted under 35 U.S.C. 154(b) by 156 days.

(21) Appl. No.: 15/185,756

(22) Filed: Jun. 17, 2016

(65) Prior Publication Data
US 2016/0301312 A1 Oct. 13, 2016

Related U.S. Application Data

(63) Continuation of application No. PCT/EP2014/078186, filed on Dec. 17, 2014.

(30) Foreign Application Priority Data

Dec. 18, 2013 (DE) .......................... 10 2013 114 271

(51) Int. Cl.
*H02M 3/158* (2006.01)
*H02M 1/32* (2007.01)
(Continued)

(52) U.S. Cl.
CPC ............. *H02M 3/158* (2013.01); *H02M 1/32* (2013.01); *H02M 7/537* (2013.01); *H02J 3/385* (2013.01);
(Continued)

(58) Field of Classification Search
CPC ............ H02M 1/32; H02M 1/34; H02M 1/38; H02M 3/3376; H02M 3/33523;
(Continued)

(56) References Cited

U.S. PATENT DOCUMENTS

| 8,018,748 B2 | 9/2011 | Leonard |
| 8,503,200 B2 * | 8/2013 | Chapman ................ H02J 3/383 |
| | | 363/131 |

(Continued)

FOREIGN PATENT DOCUMENTS

| CN | 102710112 A | 10/2012 |
| CN | 103199724 A | 7/2013 |

*Primary Examiner* — Kyle J Moody
*Assistant Examiner* — Kevin H Sprenger
(74) *Attorney, Agent, or Firm* — Eschweiler & Potashnik, LLC

(57) ABSTRACT

A method and corresponding system for operating an inverter includes setting an input voltage ($U_{PV}$) of the inverter by an input-side DC-DC converter and/or an output-side inverter bridge, wherein the input voltage ($U_{PV}$) corresponds to an MPP voltage ($U_{MPP}$) at which a generator connectable on the input side outputs a maximum electrical power, and determining a first temperature value ($T_{DCDC}$) in the DC-DC converter and a second temperature value ($T_{DCAC}$) in the inverter bridge. The method or corresponding system further includes changing the input voltage ($U_{PV}$) of the inverter with respect to the MPP voltage ($U_{MPP}$) if at least one of the determined temperature values ($T_{DCDC}$, $T_{DCAC}$) exceeds a limit value ($T_{max,DCDC}$, $T_{max,DCAC}$) assigned to the respective temperature values ($T_{DCDC}$, $T_{DCAC}$), increasing the input voltage ($U_{PV}$) with respect to the MPP voltage ($U_{MPP}$) if an exceedance of the limit value ($T_{max,DCDC}$) for the first temperature value ($T_{DCDC}$) in the DC-DC converter is determined and/or the MPP voltage ($U_{MPP}$) lies below a predefined limit voltage ($U_{limit}$), and (Continued)

otherwise reducing the input voltage ($U_{PV}$) ith respect to the MPP voltage ($U_{MPP}$).

17 Claims, 7 Drawing Sheets

(51) Int. Cl.
    *H02M 7/537*     (2006.01)
    *H02M 3/156*     (2006.01)
    *H02M 7/5387*     (2007.01)
    *H02M 1/00*     (2006.01)
    *H02J 3/38*     (2006.01)

(52) U.S. Cl.
    CPC ........ *H02M 3/156* (2013.01); *H02M 7/53871* (2013.01); *H02M 2001/007* (2013.01); *H02M 2001/327* (2013.01); *Y02E 10/58* (2013.01)

(58) Field of Classification Search
    CPC ........ H02M 3/3384; H02M 7/48; H02M 7/51; H02M 7/538; H02M 7/5387; H02M 7/003; H02M 7/53871; H02M 7/53875; H02M 7/53803; H02M 7/537; H02M 7/53835; H02M 7/5381; H02M 7/53806; H02M 7/53846; H02M 3/158; Y02B 70/1491; Y02B 70/1441
    USPC ................................. 363/55–56.05, 131–134
    See application file for complete search history.

(56) References Cited

U.S. PATENT DOCUMENTS

| | | | |
|---|---|---|---|
| 8,922,185 B2* | 12/2014 | Ehlmann | H02J 3/385 |
| | | | 323/284 |
| 9,698,668 B2* | 7/2017 | Jones | H02M 1/12 |
| 2010/0133904 A1 | 6/2010 | Klodowski et al. | |
| 2011/0298305 A1* | 12/2011 | Chisenga | H02M 3/156 |
| | | | 307/151 |
| 2012/0081200 A1* | 4/2012 | Silva | H01F 27/24 |
| | | | 336/20 |
| 2012/0320641 A1* | 12/2012 | Chapman | H02J 3/383 |
| | | | 363/37 |
| 2014/0211530 A1* | 7/2014 | Chen | H02M 7/53871 |
| | | | 363/132 |

* cited by examiner

US 10,186,966 B2

PHOTOVOLTAIC INVERTER COMPRISING AN UPSTREAM DC/DC CONVERTER AND TEMPERATURE REGULATION OF THE POWER SEMICONDUCTORS

CROSS REFERENCE TO RELATED APPLICATIONS

This application claims priority to International Patent Application number PCT/EP2014078186, filed on Dec. 17, 2014, which claims priority to German Patent Application number 10 2013 114 271.0, filed on Dec. 18, 2013, and is hereby incorporated by reference in its entirety.

FIELD

The disclosure relates to a method for operating an inverter, in particular as part of an energy generating installation, and to an inverter for carrying out the method.

BACKGROUND

Inverters serve for converting an electrical power generated by a generator, for example an electrical power generated by a photovoltaic generator in the form of an electrical DC current, into an AC current for feeding into an AC voltage grid. For this purpose, an inverter comprises an input-side DC-DC converter and an output-side inverter bridge in order to set, by means of power semiconductors used therein, an input voltage of the inverter in such a way that the maximum possible power is drawn from the generator by virtue of the latter being operated at its maximum power point (MPP), wherein the input voltage is tracked to possible changes in the MPP (MPP tracking, MPPT for short). In this case, as a result of losses arising in the components of the inverter, in particular as a result of switching losses in the power semiconductors, as a result of ohmic losses in other components, and as a result of magnetization reversal losses occurring in particular in inductors within the inverter, heating of the components of the inverter occurs, in particular heating of the power semiconductors and of the inductors, wherein the components may be damaged as a consequence of excessive heating.

Therefore, it is necessary to monitor temperatures within the inverter and, upon exceedance of limit values assigned to the temperatures, to reduce the power loss arising in the components, in particular by reducing the electrical power of the generator and thus also the electrical power converted by the inverter.

DE 102011007929 A1 discloses a method for downwardly regulating an inverter in which a first measurement variable, representative of a temperature within the inverter bridge, a second measurement variable, representative of an electrical power fed into an AC voltage grid, and further measurement variables are detected, wherein the further measurement variables may comprise a voltage at the generator terminals of the inverter, i.e. an input voltage of the inverter. Depending on the measurement variables, a reduced power value is determined, to which the electrical power fed into the AC voltage grid is reduced, in particular by a DC current generated by the generator being reduced to a maximum generator current value; in the case of a photovoltaic generator, this reduction of the DC current generated by the generator is performed on the basis of an increase in the input voltage of the inverter.

EP 0827254 A1 discloses a method for controlling a power of an inverter for a photovoltaic generator in which an input voltage of the inverter is regulated in such a way that a maximum possible electrical power is drawn from the photovoltaic generator, provided that it is below a limit value for the electrical power processed by the inverter. If the maximum possible electrical power of the photovoltaic generator exceeds the limit value, the input voltage of the inverter is increased and subsequently regulated in such a way that the power drawn from the photovoltaic generator corresponds to the limit value. As a result, the inverter is protected against overheating.

US 20130077372 A1 discloses a method for operating an inverter for a photovoltaic generator with an input-side DC-DC converter at an operating point with reduced power, in which the operating point with reduced power, if the MPP power of the photovoltaic generator exceeds a maximum permitted electrical power specified for the inverter, is set by an input voltage of the inverter which is below or above the MPP voltage of the photovoltaic generator being set by means of the DC-DC converter. In this case, an operating point with an input voltage below the MPP voltage is chosen if an open circuit voltage of the photovoltaic generator is above a maximum permitted input voltage of the inverter and a short-circuit current of the photovoltaic generator is below a maximum permitted input-side DC current; otherwise, an operating point with an input voltage above the MPP voltage is chosen. This method makes it possible to prevent in particular an overloading of the inverter and at the same time a switching-off of the inverter on account of an excessively high input voltage and/or on account of an excessively high DC current.

US 20090285998 discloses a method for operating an inverter, wherein the inverter is connected to an electrical generator on the input side via a DC-DC converter and an input voltage of the inverter corresponds, by means of MPP tracking, to an MPP voltage at which the generator outputs a maximum electrical power, wherein a temperature value in the DC-DC converter is determined and the MPP tracking is discontinued if the temperature value in the DC-DC converter exceeds a maximum permissible limit value.

SUMMARY

The disclosure addresses a problem of protecting an inverter against thermal overloading by changing the input voltage of the inverter with respect to the MPP voltage, wherein, on the one hand, the losses arising in the components of the inverter are reduced precisely sufficiently and, on the other hand, the electrical power of a generator connected on the input side and thus also the output power of the inverter are only minimally reduced.

DETAILED DESCRIPTION

In a method according to the disclosure for operating an inverter, an input voltage of the inverter is set by an input-side DC-DC converter and/or an output-side inverter bridge. In normal operation the input voltage corresponds to an MPP voltage at which a generator connectable on the input side outputs a maximum electrical power. A first temperature value in the DC-DC converter and a second temperature value in the inverter bridge are determined. The input voltage of the inverter is changed with respect to the MPP voltage if at least one of the determined temperature values exceeds a limit value assigned to it.

In the method according to the disclosure, the input voltage is increased with respect to the MPP voltage if an exceedance of the limit value for the first temperature value in the DC-DC converter is determined and/or the MPP voltage lies below a predefined limit voltage. Otherwise, the input voltage is reduced with respect to the MPP voltage.

The disclosure is based on the insight that in the case of an overtemperature in the inverter, for the purpose of optimally reducing the power loss arising in the individual components of the inverter while at the same time maximizing the electrical power generated and fed in, it is not sufficient for the electrical power output by the generator to be reduced sweepingly. Rather, an operating method that is optimal particularly with regard to a still maximized output power of the inverter must take into account in what component of the inverter the overtemperature is specifically present. If an overtemperature is determined in the DC-DC converter, the input voltage can be reduced in any case. By contrast, if an overtemperature is determined exclusively outside the DC-DC converter, i.e. in particular in the inverter bridge, the direction of the change of the input voltage depends on the ratio between the MPP voltage and a limit voltage, wherein the limit voltage lies within the permissible input voltage range of the inverter and in particular within the MPP voltage range settable by the inverter.

In specific terms, this means, for example, that it is not advantageous to lower the input voltage if there is an overtemperature in the DC-DC converter of the inverter and the DC-DC converter is operated in a clocked fashion, since the DC current generated by the generator and hence in particular switching losses and ohmic losses within the DC-DC converter may rise as a result; in this case, rather, an increase in the input voltage leads to an optimum reduction of the power loss within the DC-DC converter. On the other hand, if there is an overtemperature within the inverter bridge, for example, it is not advantageous to increase a voltage present at the inverter bridge on the input side, since switching losses within the inverter bridge depend on the voltage present at the inverter bridge on the input side and may likewise be increased; in this case, a reduction of the voltage present at the inverter bridge on the input side leads to an optimum reduction of the power loss as a result of a reduction of the input voltage.

One aspect of the disclosure thus involves, on the one hand, in the case of an overtemperature within the DC-DC converter, increasing the input voltage and, on the other hand, in the case of an overtemperature in the inverter bridge, while taking account of the position of the MPP voltage relative to a limit voltage, deciding whether an increase or a reduction of the input voltage brings about an optimum reduction of the power loss in a specific operating situation.

In one embodiment of the present disclosure, the limit voltage is between 50% and 150%, and in another embodiment between 80% and 120%, of a minimum voltage of a DC voltage link circuit of the inverter. In this case, the minimum voltage of the DC voltage link circuit may correspond to a minimum required link circuit voltage for feeding an AC current into an AC voltage grid.

The limit voltage may be fixedly predefined or optionally is defined depending on the temperature values determined during normal operation with maximum possible electrical power. What may be achieved as a result is that, particularly in situations in which both the first temperature value in the DC-DC converter and the second temperature value in the inverter bridge are close to or above their respective limit values, no contrary effects arise as a result of a change of the input voltage in one direction or the other.

By way of example, a reduction of the input voltage performed on account of an overtemperature within the inverter bridge, while the MPP voltage lies below the limit voltage, leads to an increase in the DC current generated by the generator and thus to an increase in the power loss within the DC-DC converter, particularly if the latter is operated in a clocked fashion. This increase in the power loss within the DC-DC converter may in turn have the effect that an overtemperature arises in the DC-DC converter. Therefore, preference is given in one embodiment to a limit voltage that is all the higher, the closer the first temperature value in the DC-DC converter is to the limit value assigned thereto. In particular, the limit voltage may in this case lie above the minimum required link circuit voltage.

On the other hand, such an increase in the power loss within the DC-DC converter that is caused by a reduction of the input voltage may be accepted if the first temperature value in the DC-DC converter is significantly below the limit value assigned to it. Therefore, preference should be given to a limit voltage that is all the lower, the lower the temperature value in the DC-DC converter. In this case, the limit voltage may be below the minimum required link circuit voltage.

In summary, this means that the limit voltage may be set depending on the temperature values in the DC-DC converter such that the input voltage reduction, advantageous in the case of an overtemperature in the inverter bridge, is carried out anyway if an increase in the power loss in the DC-DC converter associated with this reduction may be accepted.

In one embodiment of the disclosure, the temperature values are in each case determined repeatedly and compared with the limit values respectively assigned to them. As a result, the components of the inverter may be continuously monitored with regard to the occurrence of overtemperatures. If an overtemperature was determined, after a change—initiated thereby—of the input voltage with respect to the MPP voltage, the difference between input voltage and MPP voltage may be increased if subsequently at least one of the determined temperature values still exceeds the limit value respectively assigned to it. As a result, the power losses arising in the components may be further reduced in order to ensure that the components are not damaged on account of a permanent overtemperature. In particular, the difference between input voltage and MPP voltage may be repeatedly increased until an input voltage is reached at which the generator no longer supplies electrical power and, consequently, no power loss at all arises any more within the inverter.

In a further embodiment of the disclosure, the input voltage of the inverter is set on the basis of an MPP tracking method in normal operation if all the determined temperature values fall below the limit values respectively assigned to them. If one of the determined temperature values exceeds the limit value assigned to it, i.e. if an overtemperature is determined in the inverter, the input voltage of the inverter is set depending on the first temperature value in the DC-DC converter and/or depending on the second temperature value in the inverter bridge. In particular, a temperature-dependent regulation may be activated for setting the input voltage of the inverter depending on a temperature value if one of the determined temperature values exceeds the limit value assigned to it, wherein the temperature-dependent regulation is deactivated again if all the determined temperature values fall below the limit values respectively assigned to them. Such a temperature-dependent regulation ensures that, on the one hand, a reduction of the power loss arising in the components, which reduction is brought about by the change of the input voltage, suffices to reduce or to limit the temperature values in such a way that the limit values respectively assigned to them are not permanently exceeded, wherein, on the other hand, the difference between the input voltage and MPP voltage and thus also the difference between instantaneous and maximum possible power of the generator are minimized in order to maximize the electrical power of the generator taking account of the thermal operating parameters of the inverter. It goes without saying that, in this embodiment, measures are to be provided which prevent switching back and forth between the MPP tracking and the temperature-dependent regulation in the case of alternating exceedance and undershooting of one of the limit values assigned to the temperature values, for example by the use of a corresponding filtering of the temperature values or a hysteresis band instead of rigid limit values.

In one embodiment of the disclosure, the input voltage may be reduced to zero, in particular by the generator being short-circuited by means of the DC-DC converter or by means of external switching elements, if the input voltage is increased on account of an exceedance of one of the limit values by one of the determined temperature values and the input voltage exceeds a limit value for the input voltage of the inverter and/or a limit value for the link circuit voltage. What is achieved as a result is that the input voltage is not increased beyond the tolerable amount for the inverter, wherein at the same time the components of the inverter are protected against damage resulting from permanent overtemperatures.

In a further embodiment of the disclosure, the input voltage may be increased to an open circuit voltage of the generator if an exceedance of the limit value for the first temperature value in the DC-DC converter is determined, while the input voltage is reduced on account of an exceedance of the limit value for the second temperature value in the inverter bridge and lies below a minimum required link circuit voltage. This is particularly advantageous for the case where firstly an overtemperature in the inverter bridge was established and the input voltage was reduced. Particularly as a result of the reduction of the input voltage and an associated activation of the DC-DC converter and/or an increase in the DC current generated by the generator, an additional overtemperature may occur in the inverter bridge. This overtemperature may be expediently counteracted by increasing the input voltage to the open circuit voltage, especially since a further reduction of the input voltage, on account of the associated increase in the DC current generated by the generator, would rather increase further the power loss arising in the DC-DC converter. Alternatively, the input voltage may be reduced to zero, in particular by the generator being short-circuited by means of the DC-DC converter, if the open circuit voltage of the generator lies above the limit value for the input voltage of the inverter and/or the limit value for the link circuit voltage.

In one embodiment of the disclosure, the temperature values in the DC-DC converter and/or in the inverter bridge may be determined on the basis of temperature models. In this case, the temperature models may process measurement values of temperature sensors which are assigned to the DC-DC converter and/or to the inverter bridge. In one embodiment, the temperature values represent temperatures at or in semiconductor switches of the DC-DC converter and/or of the inverter bridge. The semiconductor switches are generally the components at which the highest power loss arises and also the temperature-critical components of the inverter, and must therefore be especially monitored.

An inverter according to the disclosure for an energy generating installation comprises an input-side DC-DC converter, an output-side inverter bridge, and a control device for driving the DC-DC converter and the inverter bridge with control signals. Furthermore, the inverter comprises temperature sensors respectively assigned to the DC-DC converter and to the inverter bridge. The inverter according to the disclosure is distinguished by the fact that the control device in conjunction with the temperature sensors is designed to perform a method according to the disclosure for changing the input voltage of the inverter in the case of an overtemperature.

In one embodiment of the inverter according to the disclosure, the generator connectable to the inverter is a photovoltaic generator and/or the DC-DC converter is a boost converter. A boost converter benefits especially from the advantages of the disclosure since a boost converter is generally activated, i.e. operated in a clocked fashion, only if the MPP voltage of the generator lies below the minimum required link circuit voltage. In this case, the DC-DC converter may comprise at least one semiconductor switch and the inverter bridge may comprise at least two semiconductor switches. Furthermore, the inverter bridge may comprise a filter inductance arranged on the output side, for which a temperature value of the filter inductance is determined on the basis of the temperature models, wherein the temperature value of the filter inductance is specific to a temperature in the filter inductance and, consequently, the filter inductance may be monitored with regard to an overtemperature on the basis of a comparison between the temperature value of the filter inductance and a limit value assigned to it. With regard to the selection according to the disclosure of the direction of the change of the input voltage, an overtemperature in the filter inductance in this case corresponds to an overtemperature in the inverter bridge.

BRIEF DESCRIPTION OF THE FIGURES

The disclosure is explained and described further below on the basis of preferred exemplary embodiments illustrated in the figures.

DETAILED DESCRIPTION

Figure 1:
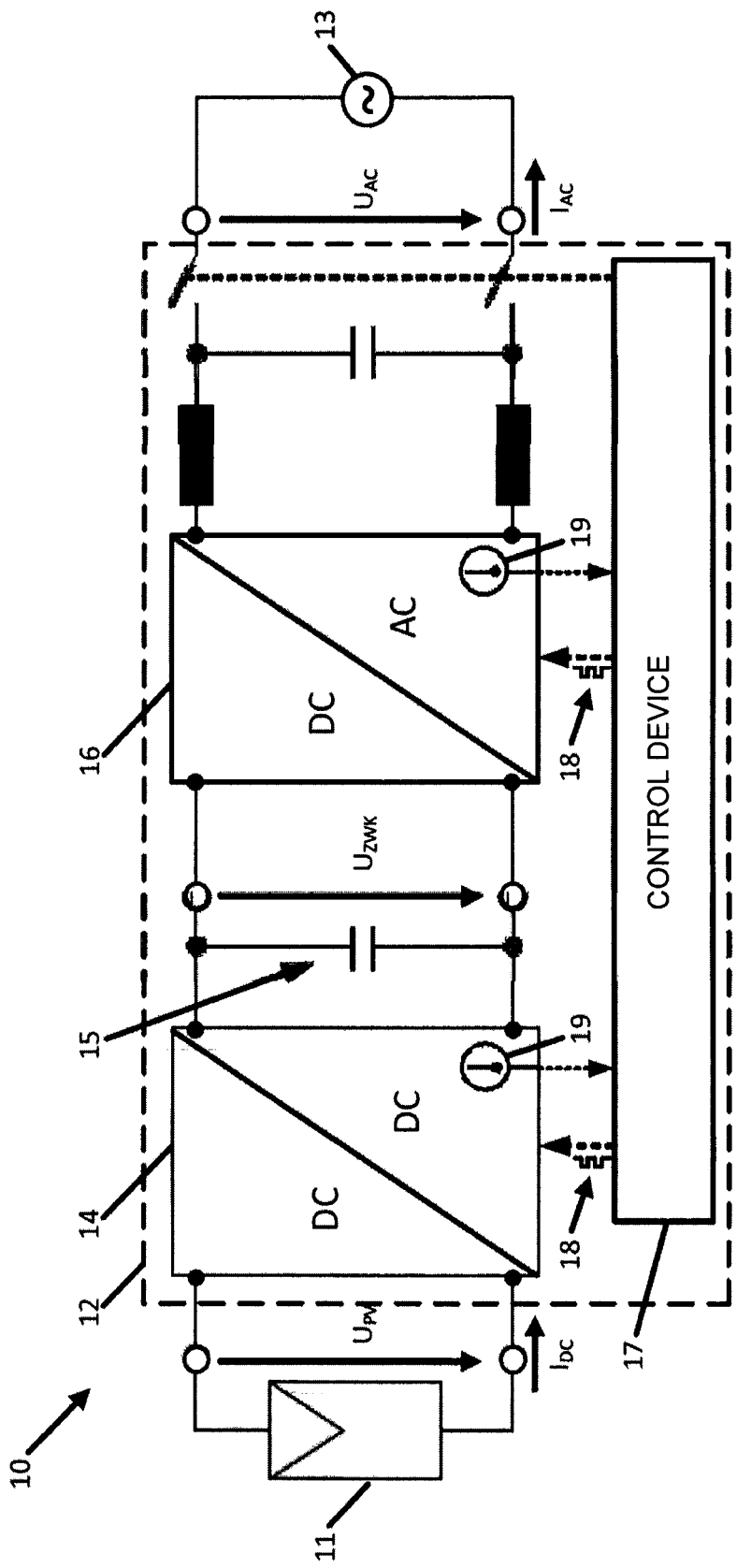
FIG. 1 shows an energy generating installation with an inverter.

FIG. 1 shows an energy generating installation 10 in which an electrical power provided by a photovoltaic generator 11 (PV generator) is fed into an AC voltage grid 13 by an inverter 12. The inverter 12 comprises a DC-DC converter 14, a DC voltage link circuit 15 (link circuit), an inverter bridge 16 (DC-AC-bridge) and, on the output side, filter inductances, a filter capacitance and disconnecting devices. The DC-DC converter 14 comprises at least one switching element, in particular a semiconductor switch, which may be operated in a clocked fashion and, particularly in conjunction with an inductance arranged in the DC-DC converter 14, brings about a voltage transformation between an input voltage $U_{PV}$, corresponding to a voltage $U_{PV}$ at the PV generator 11, and a link circuit voltage $U_{ZWK}$ at the link circuit 15. The inverter bridge 16 comprises at least two switching elements, in particular semiconductor switches, which may be operated in a clocked fashion and bring about a conversion of the DC voltage $U_{ZWK}$ present at the link circuit 15 into an output-side AC voltage $U_{AC}$, such that the DC current $I_{DC}$ generated by the PV generator 11 on the input side is converted into an output-side AC current $I_{AC}$.

The switching elements of the DC-DC converter 14 and of the inverter bridge 16 are driven by a control device 17 with switching pulses 18, such that a DC current $I_{DC}$ generated by the PV generator 11 on the input side is optimally converted into an AC current $I_{AC}$ that can be fed into the AC voltage grid 13 on the output side. For this purpose, the control device 17 evaluates in particular the link circuit voltage $U_{ZWK}$ and the electrical power $P_{PV}=U_{PV} \times I_{DC}$ generated by the PV generator 11 and sets the clocking of the switching elements of the DC-DC converter 14 on the basis of the switching pulses 18 and thus the voltage transformation between $U_{PV}$ and $U_{ZWK}$ in such a way that, on the one hand, a link circuit voltage $U_{ZWK}$ sufficient for feeding electrical power into the AC voltage grid 13 is present at the link circuit 15 and, on the other hand, the input voltage $U_{PV}$ present at the PV generator 11 corresponds to that voltage $U_{MPP}$ at which the PV generator 11 supplies the maximum possible electrical power $P_{MPP}$, i.e. at which the product of the voltage $U_{PV}$ at the PV generator 11 and the DC current $I_{DC}$ generated by the PV generator 11 is maximal. An operating point set in this way is generally referred to as the maximum power point (MPP) and may vary with time on account of changing ambient conditions such as irradiation and ambient temperature. Therefore, the control device 17 comprises a suitable MPP tracking method for setting the input voltage $U_{PV}$ to the MPP voltage $U_{MPP}$ of the PV generator 11, in particular tracking it thereto (so-called MPP tracking, MPPT for short).

The inverter 12 furthermore comprises temperature sensors 19 for detecting temperatures in the DC-DC converter 14, in the inverter bridge 16 and optionally in further components such as, for example, the output-side filter inductances. In this case, from the detected temperatures, further temperature values T of individual components of the DC-DC converter 14 and/or of the inverter bridge 16, in particular temperature values T at or in the switching elements used there, may be determined on the basis of temperature models by virtue of the fact that the temperature models evaluate such temperatures which are detected at positions which do not correspond to the positions of the switching elements, taking account of further parameters such as measured voltages, measured currents and/or predefined properties of the drive signals for the switching elements, and calculate therefrom temperature values which are representative of temperatures at or in the switching elements. In principle, however, the temperature sensors 19 may also be arranged in such a way that the detected temperatures themselves may be used as relevant temperature values T, in particular by virtue of the temperature sensors 19 being arranged directly at or even in the switching elements.

The determined temperature values T are monitored, for example by the control device 17, and are compared with limit values respectively assigned to them in order to avoid damage to components of the inverter as a result of over- heating. If one of the determined temperature values T exceeds the limit value assigned to it, i.e. if there is an overtemperature in one of the components of the inverter 12, suitable countermeasures must be taken to reduce the power losses arising in the affected components or, if this does not suffice, to cease operation of the inverter at least temporarily.

The power loss arising in a component may depend on various factors. In the case of clocked semiconductor switches as switching elements in the DC-DC converter 14 and/or in the inverter bridge 16, the power loss is composed of switching losses, i.e. losses during a switching process, and conduction losses, i.e. losses during the conduction of current through the switch. The switching losses are substantially proportional to the voltage dropped across the switch in the off state and to the current flowing through the switch in the on state. The conduction losses in the on state are substantially proportional to the voltage dropped across the switch (residual or forward voltage) and to the current flowing through the switch.

The at least one switching element of a DC-DC converter 14 may be arranged, particularly in the case of a buck converter, in series between a terminal of the PV generator 11 and a terminal of the link circuit 15 or, particularly in the case of a boost converter, parallel with the respective terminals of the PV generator 11 and of the link circuit 15. Particularly in the case of a boost converter as DC-DC converter 14 which comprises a parallel connection of the switching element to the link circuit 15, the voltage dropped across the switching element in the off state corresponds to the link circuit voltage $U_{ZWK}$.

In the off state, a voltage corresponding to an instantaneous difference between the potential of one of the terminals of the link circuit 15 and the potential of one of the terminals for connection to the AC voltage grid 13 is dropped across the switching elements of the inverter bridge, particularly across those of a single-phase H-bridge and a three-phase B6 or NPC bridge. In this case, the voltage of the link circuit 15 must be higher than the grid peak voltage or higher than the maximum difference between the potentials of the individual phases of the AC voltage grid 13, in order that the inverter 12 can feed electrical power into the AC voltage grid 13.

Figure 2:
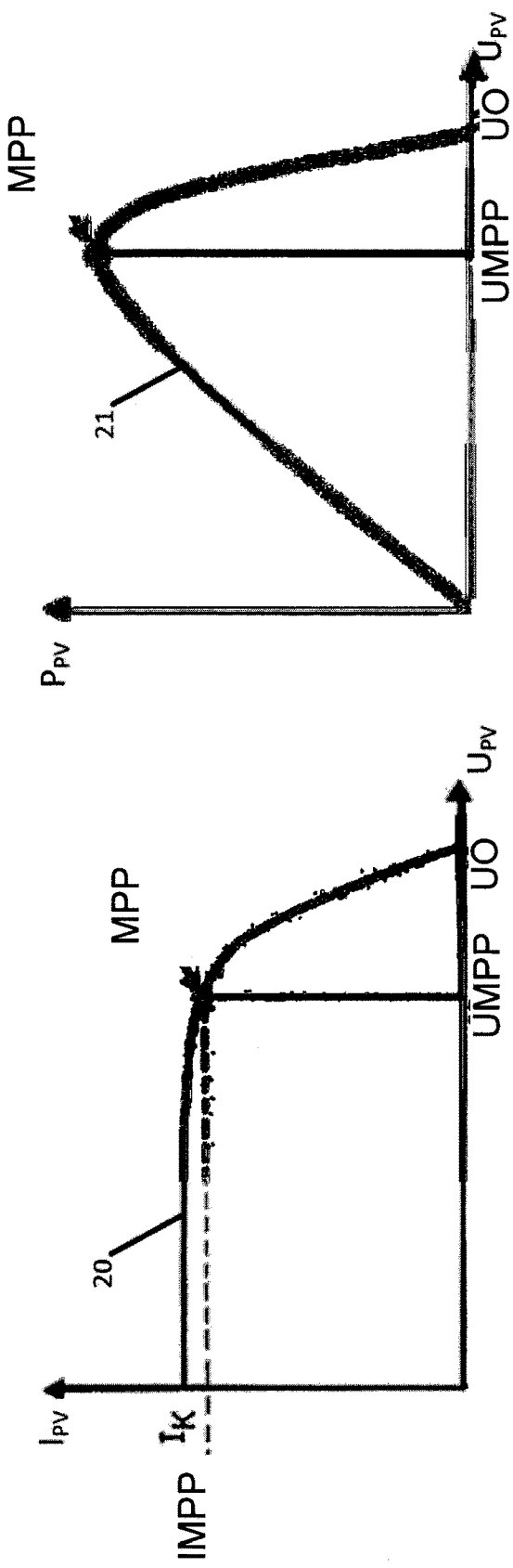
FIG. 2 shows simplified illustrations of a current-voltage characteristic curve and of a power-voltage characteristic curve of a photovoltaic generator.

FIG. 2 shows a simplified exemplary illustration of a current-voltage characteristic curve 20 in the left-hand diagram and a simplified exemplary illustration of a power-voltage characteristic curve 21 of a PV generator 11 in the right-hand diagram. The PV generator 11 generates a maximum short-circuit current $I_K$ if its terminals are short-circuited, i.e. if $U_{PV}$ is equal to zero, for example on account of a permanently turned-on switching element of a boost converter, wherein the power $P_{PV}$ of the PV generator 11 is then equal to zero. As the voltage $U_{PV}$ rises, the current $I_{PV}$ firstly falls, while the power $P_{PV}$ of the PV generator 11 rises. At a voltage $U_{PV}=U_{MPP}$ a current $I_{MPP}$ flows, wherein the product of voltage $U_{PV}$ and current $I_{PV}$ is maximal at this operating point, i.e. the PV generator is operated at the maximum power point (MPP). If the voltage $U_{PV}$ is increased further, then the current $I_{PV}$ falls further and becomes equal to zero if the voltage $U_{PV}$ corresponds to the open circuit voltage $U_0$ of the PV generator, wherein the power $P_{PV}$ of the PV generator 11 is then likewise equal to zero.

In principle, an inverter 12 for optimally utilizing the radiation power incident on a PV generator 11 is operated in such a way that an input voltage $U_{PV}$ corresponding to the MPP voltage $U_{MPP}$ of the generator is present at its inputs and thus at the PV generator 11. As a result, the maximum possible electrical power flows from the PV generator 11 into the inverter 12, is converted into AC current by the inverter 12 and, minus the losses occurring in the inverter 12, is fed into the AC grid 13. At any other operating point deviating from the MPP toward the left or right relative to the input voltage $U_{PV}$, the PV generator 11 generates a reduced electrical power. It is known from the prior art, in the case of an imminent overheating of components of the inverter 12, to set an operating point deviating from the MPP with regard to the input voltage $U_{PV}$, wherein it is assumed that, on account of the reduction of the electrical power converted by the inverter 12, the power loss in the components of the inverter 12 is reduced as well.

Figure 3:
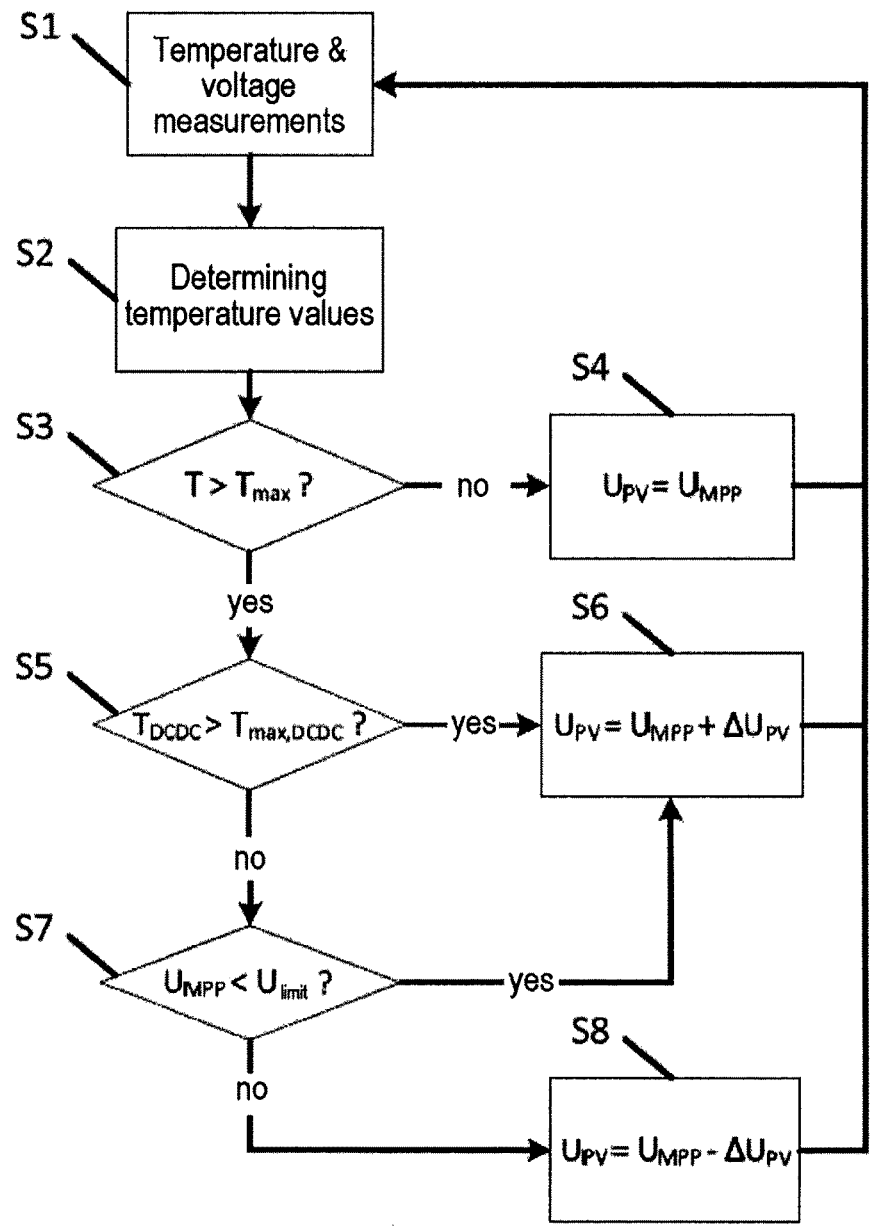
FIG. 3 shows one embodiment of a method according to the disclosure in the form of a flow diagram, FIG. 4a and FIG. 4b elucidate one embodiment of a method in accordance with FIG. 3 on the basis of the simplified exemplary illustrations of the characteristic curves in accordance with FIG. 2.

FIG. 3 shows one embodiment of a method according to the disclosure, in particular for operating an inverter 12 in accordance with FIG. 1 in the form of a flow diagram. Firstly, S1 involves measuring temperatures and voltages within the inverter 12. In this case, the temperatures are detected by means of the temperature sensors 19, for example. The measured voltages comprise in particular the voltage $U_{ZWK}$ of the link circuit 15 and the input voltage $U_{PV}$, wherein the input voltage $U_{PV}$ firstly corresponds to the MPP voltage $U_{MPP}$ as long as the inverter 12 is in a normal operating state in which MPP tracking is performed. S2 involves determining from the temperatures measured at S1 temperature values T which are representative of the temperatures within individual components of the inverter 12 and comprise in particular temperature values $T_{DCDC}$ of the DC-DC converter 14 and temperature values $T_{DCAC}$ of the inverter bridge 16. In order to determine the temperature values T, it is possible to use temperature models in which further measurement values are processed alongside the data detected at S1.

S3 involves comparing the temperature values T determined at S2 with limit values $T_{max}$ respectively assigned to them, i.e. checking whether there is an overtemperature in the inverter 12. In this case, the limit values $T_{max}$ for the different temperature values T determined and thus for the different components of the inverter 12 may be different, particularly if different types of switching elements are used in the inverter, for example IGBTs in the DC-DC converter 14 and MOSFETs in the inverter bridge 16, or vice versa. It is also possible to use different limit values $T_{max}$ for the switching elements of the inverter bridge 16, particularly if switching elements of different designs are used in the individual bridge branches of the inverter bridge 16.

S3 involves deciding whether any of the determined temperature values T exceeds the limit value $T_{max}$ respectively assigned to it. If this is not the case (NO), the method branches to S4 and the inverter continues to be operated in the normal operating state and the PV generator 11 at the MPP, wherein the input voltage $U_{PV}$ of the PV generator still corresponds to the MPP voltage $U_{MPP}$. Afterwards, the method is continued at S1, i.e. the method runs through acts S1, S2, S3 and S4 cyclically or quasi-continuously as long as no overtemperature is determined at S3.

However, if it is determined at S3 that any of the determined temperature values T exceeds a limit value $T_{max}$ respectively assigned to it (YES), then the method branches to S5. S5 involves checking whether a temperature value $T_{DCDC}$ assigned to the DC-DC converter 14, which temperature value may be representative in particular of temperatures at or in switching elements of the DC-DC converter 14, exceeds a limit value $T_{max,DCDC}$ assigned to it. If this is the case (YES), then the method branches to S6. S6 involves setting an input voltage $U_{PV}$ which is increased by an absolute value $\Delta U_{PV}$ with respect to the MPP voltage $U_{MPP}$. For this purpose, the inverter 12 may be operated in particular by virtue of the control device 17 for example in such a way that the DC-DC converter 14 receives modified control signals 18 which bring about a reduced voltage transformation ratio between $U_{ZWK}$ and $U_{PV}$. Alternatively or in addition, the voltage $U_{ZWK}$ of the link circuit 15 and thus, particularly with the DC-DC converter 14 deactivated, also the input voltage $U_{PV}$ may be increased, for example by the inverter bridge 16 feeding a reduced electrical power into the AC grid 13.

However, if it is determined at S5 that the temperature value $T_{DCDC}$ assigned to the DC-DC converter 14 does not exceed a limit value $T_{max,DCDC}$ assigned to it (NO), which conversely means that a different temperature value T, in particular a temperature value $T_{DCAC}$ which is assigned to the inverter bridge 16 and which is representative of temperatures in or at switching elements of the inverter bridge 16, exceeds a limit value $T_{max}$ respectively assigned to it, then the method branches to S7.

S7 involves checking whether the MPP voltage $U_{MPP}$ lies below a limit voltage $U_{limit}$. If this is the case (YES), the method branches to S6, in which the input voltage $U_{PV}$ is increased by an absolute value $\Delta U_{PV}$ with respect to the MPP voltage $U_{MPP}$. However, if it is determined at S7 that the MPP voltage $U_{MPP}$ lies above the limit voltage $U_{limit}$ (NO), then the method branches to S8. S8 involves setting an input voltage $U_{PV}$ which is reduced by an absolute value $\Delta U_{PV}$ with respect to the MPP voltage $U_{MPP}$. For this purpose, the inverter 12 may be operated in particular on the basis of the control device 17 for example in such a way that the DC-DC converter 14 receives modified control signals 18 which bring about an increased voltage transformation ratio between $U_{ZWK}$ and $U_{PV}$. Alternatively or additionally, the inverter bridge 16 may feed a momentarily increased electrical power into the AC grid 13, as a result of which the voltage $U_{ZWK}$ of the link circuit 15 and thus, particularly with the DC-DC converter 14 deactivated, also the input voltage $U_{PV}$ decreases, wherein the inverter bridge 16, after the sufficient decrease of the voltage $U_{ZWK}$ of the link circuit 15, feeds into the AC grid 13 an electrical power which is reduced with respect to the MPP power and which corresponds to the reduced electrical power generated by the PV generator 11.

With respect to the following acts S6 and S8, the method is continued at S1, i.e. the method runs through acts S1, S2, S3 and, if appropriate, S5 and S7 cyclically or quasi-continuously. If the change of the input voltage $U_{PV}$ with respect to the MPP voltage $U_{MPP}$ that is performed at acts S4 and S6, respectively, and the resultant reduction of the power loss occurring in the components of the inverter 12 suffice to decrease the temperature values T to an extent that the latter no longer exceed the limit values $T_{limit}$ assigned to them, the method will branch again from S3 to S4, such that the inverter is operated in the normal operating state and the PV generator 11 is operated with an input voltage $U_{PV}$ corresponding to the MPP voltage $U_{MPP}$ at the MPP. In this case, it is recommendable in one embodiment to maintain a direction of the change of the input voltage $U_{PV}$ upward or downward, once the direction has been taken on account of an ascertained overtemperature, as long as the overtemperature is present in the inverter 12.

Figure 4A:
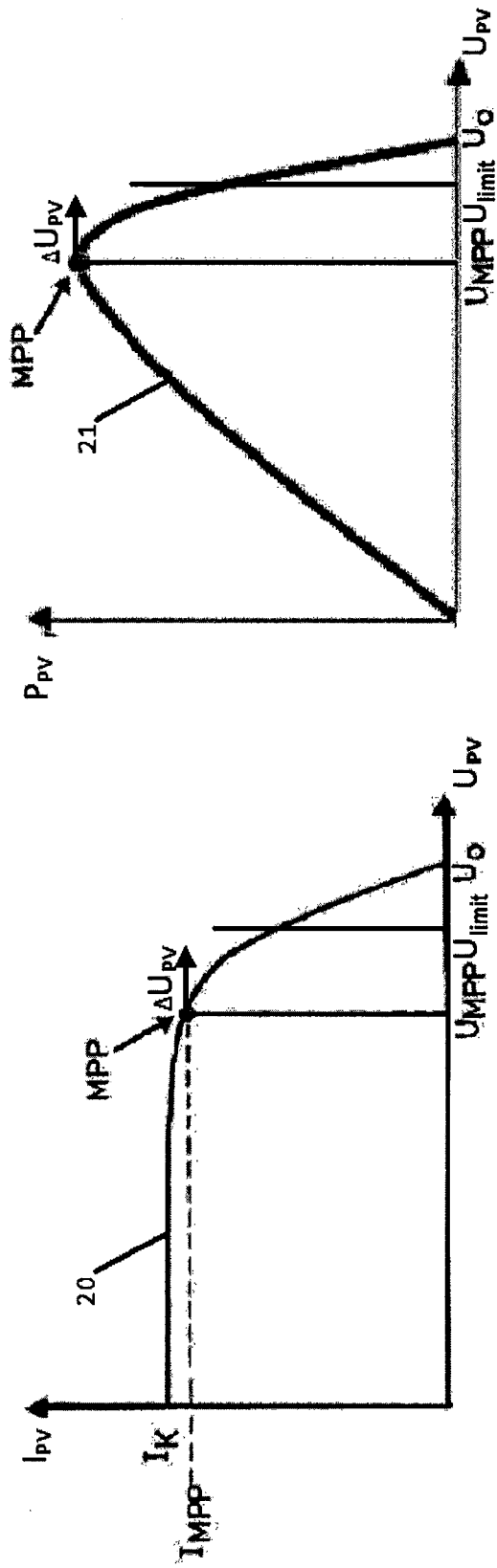
Figure 4B:
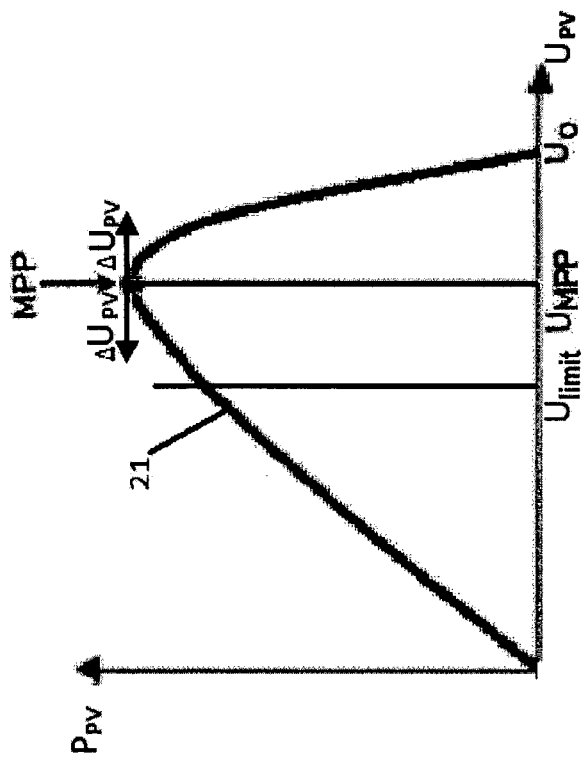
Figure 4B:
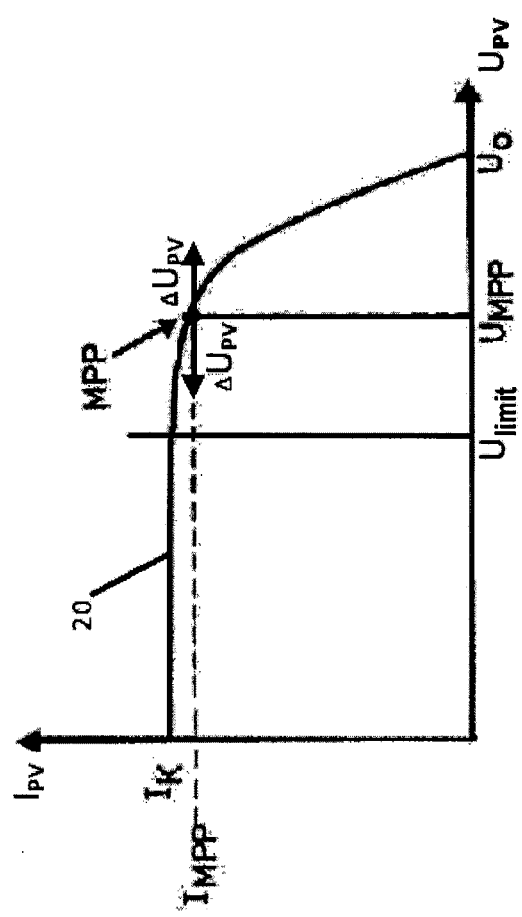

FIG. 4a and FIG. 4b elucidate the embodiment of the method in accordance with FIG. 3 on the basis of simplified exemplary illustrations of the characteristic curves in accordance with FIG. 2.

FIG. 4a illustrates the implementation of act S6 in accordance with FIG. 3. In the normal operating state of the inverter 12, the PV generator 11 is operated at an input voltage $U_{PV}$ which corresponds to the MPP voltage $U_{MPP}$, wherein the MPP voltage $U_{MPP}$ lies below the limit voltage $U_{limit}$. If an overtemperature is then determined at S3, then the input voltage $U_{PV}$ is increased by an absolute value $\Delta U_{PV}$ with respect to the MPP voltage $U_{MPP}$ either on account of an overtemperature localized in the DC-DC converter 14 at S5 or on account of the relation between $U_{MPP}$ and $U_{limit}$ determined at S7.

FIG. 4b illustrates characteristic curves of the PV generator 11 for which the MPP voltage $U_{MPP}$ lies above the limit voltage $U_{limit}$. Which of acts S6 or S8 in accordance with FIG. 3 is performed in this case upon the occurrence of an overtemperature depends on where the overtemperature occurs within the inverter 12. If the overtemperature occurs in the DC-DC converter 14 ($T_{DCDC} > T_{max,DCDC}$), then the method in accordance with FIG. 3 branches from S5 to S6 and the input voltage $U_{PV}$ is increased by an absolute value $\Delta U_{PV}$ with respect to the MPP voltage $U_{MPP}$. However, if the overtemperature does not occur in the DC-DC converter 14 and thus occurs in particular in the inverter bridge 16, then the method in accordance with FIG. 3 branches from S6 via step S7, in which the position of the MPP voltage $U_{MPP}$ with respect to the limit voltage $U_{limit}$ is checked, to S8 and the input voltage $U_{PV}$ is reduced by an absolute value $\Delta U_{PV}$ with respect to the MPP voltage $U_{MPP}$.

Figure 5:
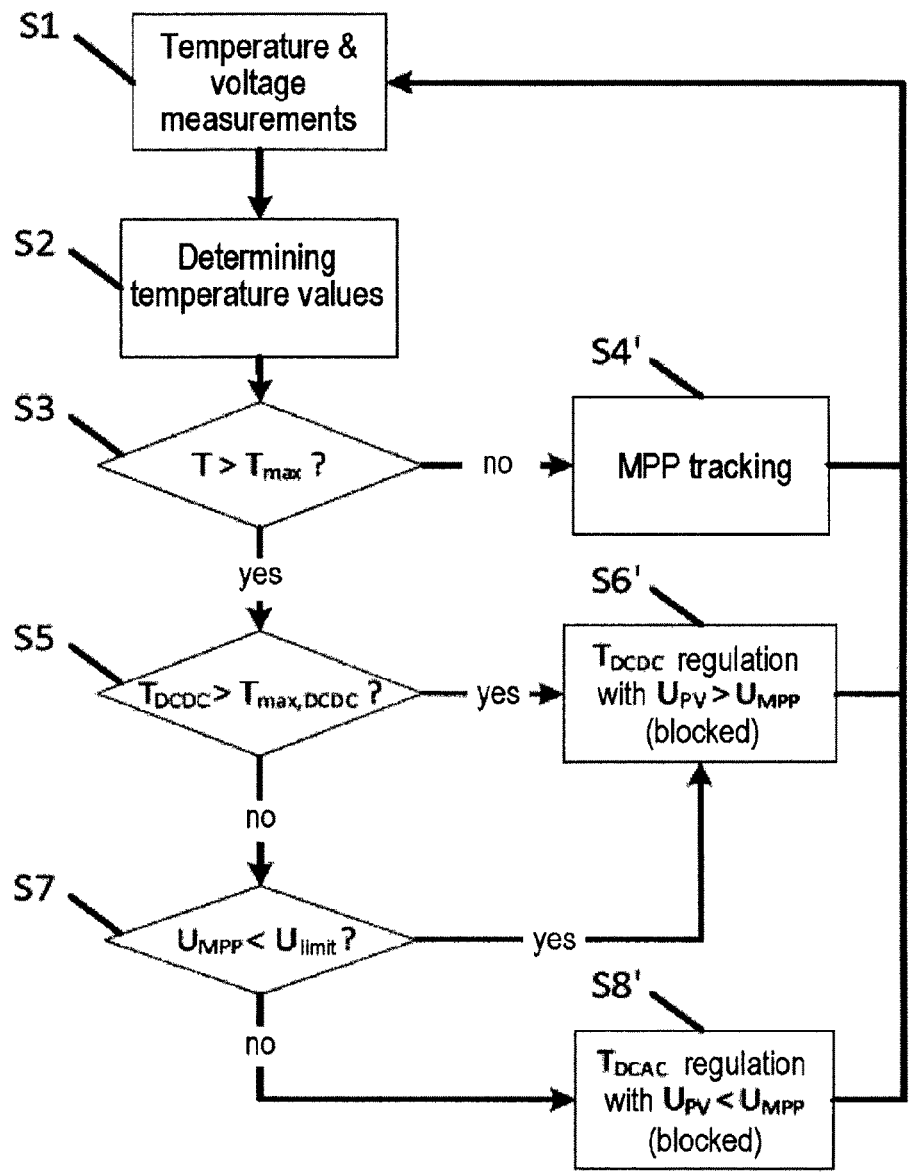
FIG. 5 shows a further embodiment of a method according to the disclosure in the form of a flow diagram.

FIG. 5 shows a further embodiment of a method according to the disclosure in the form of a flow diagram. By comparison with the embodiment in accordance with FIG. 3, acts S4, S6 and S8 have been replaced by acts S4', S6' and S8'. In this case, S4' involves activating MPP tracking in the inverter, provided that no overtemperature is determined in the inverter 12. In this case, it is appropriate to run through acts S1 to S3 with the same cyclic timing as the MPP tracking, i.e., before each new MPP tracking step, to compare the temperature values T with the limit values $T_{max}$ respectively assigned to them in accordance with S3 and subsequently to perform the next MPP tracking act (S4') or to branch to S5 if an overtemperature was determined.

If an overtemperature was determined at S3 and the method branches to S6' on account of a fulfillment of the conditions in accordance with S5 or S7, a $T_{DCDC}$ regulation is activated instead of the MPP tracking. In this case, the input voltage $U_{PV}$ is reduced with respect to the MPP voltage $U_{MPP}$ and the power loss arising in the inverter 12 is thus reduced. Using the temperature value $T_{DCDC}$ assigned to the DC-DC converter 14 as a regulated variable, at S6' the input voltage $U_{PV}$ is set in such a way that the respective present temperature value $T_{DCDC}$ in the DC-DC converter 14 as actual value is regulated to a setpoint value $T_{max,DCDC}$. This regulation is locked, and so it remains activated as long as an overtemperature is determined at S3, wherein use of a hysteresis at S3 prevents switching back and forth between MPP tracking in accordance with S4' and the $T_{DCDC}$ regulation in accordance with S6' in the event of only momentary undershooting of all the limit values $T_{max}$ for the temperature values T.

If an overtemperature was determined at S3 and none of the conditions in accordance with S5 or S7 is fulfilled, such that the method branches to S8', a $T_{DCAC}$ regulation is activated instead of the MPP tracking. In this case, the input voltage $U_{PV}$ is increased with respect to the MPP voltage $U_{MPP}$ such that the electrical power generated by the PV generator 11 and thus also the power loss arising in the inverter 12 are reduced. Using the temperature value $T_{DCAC}$ assigned to the inverter bridge 16 as a regulated variable, at S6' the voltage $U_{PV}$ at the PV generator 11 is set in such a way that the respective present temperature value $T_{DCAC}$ in the inverter bridge 16 as actual value is regulated to a setpoint value $T_{max,DCAC}$. This regulation is locked, and so it remains activated as long as an overtemperature is determined at S3, wherein here, too, temporal averaging or filtering of the detected temperatures or of the determined temperature values T or use of a hysteresis at S3 prevents switching back and forth between MPP tracking in accordance with S4' and the $T_{DCAC}$ regulation in accordance with S6' in the event of only momentary undershooting of all the limit values $T_{max}$ for the temperature values T.

Figure 6:
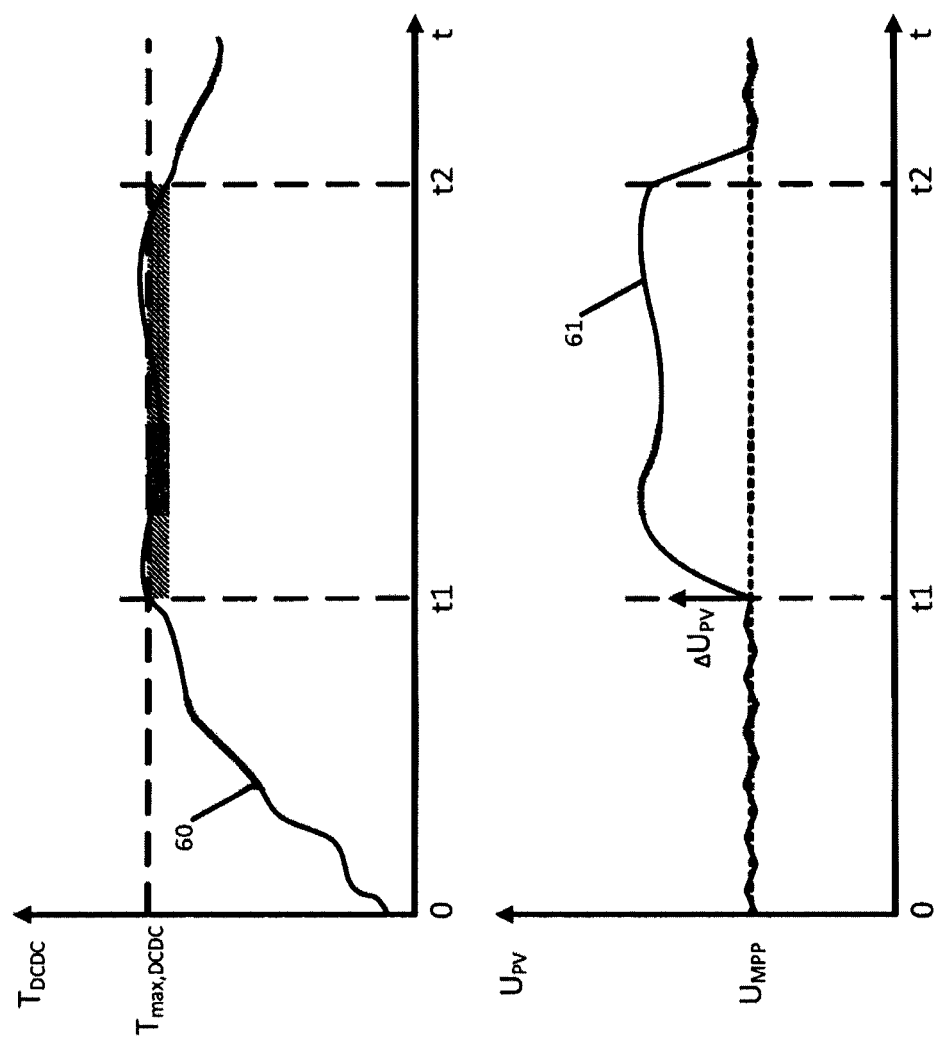
FIG. 6 shows exemplary time profiles of temperatures and voltages in an energy generating installation in accordance with FIG. 1.

FIG. 6 shows, in the upper diagram, an exemplary time profile 60 of the temperature value $T_{DCDC}$ in a DC-DC converter 14 and, in the lower diagram, an exemplary time profile 61 of the input voltage $U_{PV}$ of an inverter 12 of an energy generating installation in accordance with FIG. 1. In the time period t=0 to t=t1, the temperature value $T_{DCDC}$ lies below the limit value $T_{max,DCDC}$ assigned to them, such that, assuming that no other overtemperatures are ascertained at S3 in accordance with FIG. 3 or FIG. 5, the input voltage $U_{PV}$ is set to the MPP voltage $U_{MPP}$ on the basis of MPP tracking. The inverter 12 operates in the normal operating mode.

At the instant t1, the temperature value $T_{DCDC}$ exceeds the limit value $T_{max,DCDC}$ assigned to it, for example on account of an ambient temperature outside the inverter 12 that increased in the course of a day and/or on account of an increased electrical power converted by the PV generator 11 and in the inverter 12, such that at S6 in accordance with FIG. 3 or at S6' in accordance with FIG. 5 the input voltage $U_{PV}$ is increased with respect to the MPP voltage $U_{MPP}$ and, if appropriate, a $T_{DCDC}$ regulation is activated. As a result, the power loss arising in the DC-DC converter 14 is reduced and the rise in the temperature $T_{DCDC}$ slows down. As long as the temperature values $T_{DCDC}$ lie above $T_{max,DCDC}$, the voltage $U_{PV}$ is increased further particularly in the context of the $T_{DCDC}$ regulation in accordance with S6' until the power loss arising in the DC-DC converter 14 is reduced to an extent such that the temperature value $T_{DCDC}$ has fallen again to the limit value $T_{max,DCDC}$. In a regulating control loop having the temperature value $T_{DCDC}$ assigned to the DC-DC converter 14 as a regulated variable, the voltage $U_{PV}$ as a manipulated variable and the limit value $T_{max,DCDC}$ as a setpoint value, the voltage $U_{PV}$ is then set in such a way that the respective present temperature value $T_{DCDC}$ in the DC-DC converter 14 substantially corresponds to the limit value $T_{max,DCDC}$, wherein slight undershooting of the limit value $T_{max,DCDC}$ into the hysteresis band illustrated in a hatched manner is permitted and, on account of the $T_{DCDC}$ regulation leads to a for example proportional decrease in the input voltage $U_{PV}$. In the flow diagram in accordance with FIG. 5, the hysteresis band can be implemented by—after activating the $T_{DCDC}$ regulation at S6'—replacing the limit values $T_{max}$ at S3 or $T_{max,DCDC}$ at S5 by limit values $T_{max}'$ reduced by the width of the hysteresis band.

Starting from the instant t2, the temperature value $T_{DCDC}$ has fallen below the limit value $T_{max,DCDC}$ and has left the hysteresis band downward, for example on account of an ambient temperature outside the inverter which has fallen to such an extent that a sufficient dissipation of the power loss arising in the components of the inverter 12 is ensured by thermal emission. Therefore, an overtemperature is no longer determined at S3 and, at S4 in accordance with FIG. 3, an input voltage $U_{PV}$ corresponding to the MPP voltage $U_{MPP}$ is set or the method in accordance with FIG. 5 branches off to S4', such that the MPP tracking is activated again. The input voltage $U_{PV}$ is therefore led again in the direction of the maximum electrical power, i.e. for example reduced in accordance with FIG. 4a. As soon as the MPP voltage $U_{MPP}$ is reached, the inverter 12 operates in the normal operating mode again.

Advantageous developments of the disclosure are evident from the patent claims, the description and the drawings. The advantages of features and of combinations of a plurality of features as mentioned in the introductory part of the description are merely by way of example and may take effect alternatively or cumulatively, without the advantages necessarily having to be achieved by embodiments according to the disclosure. Further features can be gathered from the drawings. The combination of features of different embodiments of the disclosure or of features of different patent claims is likewise possible departing from the chosen dependency references of the patent claims and is suggested hereby. This also concerns such features which are illustrated in separate drawings or are mentioned in the description thereof. These features may also be combined with features of different patent claims. Likewise, features presented in the patent claims may be omitted for further embodiments of the disclosure.

The invention claimed is:

1. A method for operating an inverter comprising:
setting an input voltage ($U_{PV}$) of the inverter by an input-side DC-DC converter and/or an output-side inverter bridge, wherein the input voltage ($U_{PV}$) corresponds to an MPP voltage ($U_{MPP}$) at which a generator connectable on the input side outputs a maximum electrical power;
determining a first temperature value ($T_{DCDC}$) in the DC-DC converter and a second temperature value ($T_{DCAC}$) in the inverter bridge;
changing the input voltage ($U_{PV}$) of the inverter with respect to the MPP voltage ($U_{MPP}$) if at least one of the determined temperature values ($T_{DCDC}$, $T_{DCAC}$) exceeds a limit value ($T_{max,DCDC}$, $T_{max,DCAC}$) assigned to the respective temperature values ($T_{DCDC}$, $T_{DCAC}$), wherein changing the input voltage $U_{PV}$ comprises:
increasing the input voltage ($U_{PV}$) with respect to the MPP voltage ($U_{MPP}$) if an exceedance of the limit value ($T_{max,DCDC}$) for the first temperature value ($T_{DCDC}$) in the DC-DC converter is determined and/or the MPP voltage ($U_{MPP}$) lies below a predefined limit voltage ($U_{limit}$); and
otherwise reducing the input voltage ($U_{PV}$) with respect to the MPP voltage ($U_{MPP}$).

2. The method as claimed in claim 1, wherein the limit voltage ($U_{limit}$) is between 50% and 150% of a minimum voltage of a DC voltage link circuit of the inverter.

3. The method as claimed in claim 2, wherein the minimum voltage of the DC voltage link circuit corresponds to a minimum required link circuit voltage ($U_{ZWK,min}$) for feeding an AC current into an AC voltage grid.

4. The method as claimed in claim 1, wherein the limit voltage ($U_{limit}$) is defined depending on the temperature values ($T_{DCDC}$, $T_{DCAC}$) determined during operation with maximum possible electrical power.

5. The method as claimed in claim 1, wherein the temperature values ($T_{DCDC}$, $T_{DCAC}$) are in each case determined repeatedly and compared with the limit values ($T_{max,DCDC}$, $T_{max,DCAC}$) respectively assigned to them.

6. The method as claimed in claim 5, wherein after a change of the input voltage ($U_{PV}$) with respect to the MPP voltage ($U_{MPP}$) the difference between input voltage ($U_{PV}$) and MPP voltage ($U_{MPP}$) is increased if at least one of the determined temperature values ($T_{DCDC}$, $T_{DCAC}$) still exceeds the limit value ($T_{max,DCDC}$, $T_{max,DCAC}$) respectively assigned to it.

7. The method as claimed in claim 1, wherein the input voltage ($U_{PV}$) of the inverter is set by virtue of an MPP tracking method if all the determined temperature values ($T_{DCDC}$, $T_{DCAC}$) fall below the limit values ($T_{max,DCDC}$, $T_{max,DCAC}$) respectively assigned to them, and wherein the input voltage ($U_{PV}$) of the inverter is set depending on the first temperature value ($T_{DCDC}$) in the DC-DC converter and/or depending on the second temperature value ($T_{DCAC}$) in the inverter bridge if one of the determined temperature values ($T_{DCDC}$, $T_{DCAC}$) exceeds the limit value ($T_{max,DCDC}$, $T_{max,DCAC}$) assigned to it.

8. The method as claimed in claim 7, wherein a temperature-dependent regulation is activated for setting the input voltage ($U_{PV}$) of the inverter depending on a temperature value ($T_{DCDC}$, $T_{DCAC}$) if one of the determined temperature values ($T_{DCDC}$, $T_{DCAC}$) exceeds the limit value ($T_{max,DCDC}$, $T_{max,DCAC}$) assigned to it, wherein the temperature-dependent regulation is deactivated if all the determined temperature values ($T_{DCDC}$, $T_{DCAC}$) fall below the limit values ($T_{max,DCDC}$, $T_{max,DCAC}$) respectively assigned to them.

9. The method as claimed in claim 1, wherein the input voltage ($U_{PV}$) is reduced to zero, in particular by the generator being short-circuited by means of the DC-DC converter, if the input voltage ($U_{PV}$) is increased on account of an exceedance of one of the limit values ($T_{max,DCDC}$, $T_{max,DCAC}$) by one of the determined temperature values ($T_{DCDC}$, $T_{DCAC}$) and exceeds a limit value ($U_{PV,max}$) for the input voltage ($U_{PV}$) of the inverter and/or a limit value ($U_{ZWK,max}$) for the link circuit voltage ($U_{ZWK}$).

10. The method as claimed in claim 1, wherein the input voltage ($U_{PV}$) is increased to an open circuit voltage ($U_0$) of the generator if an exceedance of the limit value ($T_{max,DCDC}$) for the first temperature value ($T_{DCDC}$) in the DC-DC converter is determined, while the input voltage ($U_{PV}$) is reduced on account of an exceedance of the limit value ($T_{max,DCAC}$) for the second temperature value ($T_{DCAC}$) in the inverter bridge and lies below a minimum required link circuit voltage ($U_{ZWK,min}$).

11. The method as claimed in claim 8, wherein the input voltage ($U_{PV}$) is reduced to zero, in particular by the generator being short-circuited by means of the DC-DC converter, if the open circuit voltage ($U_0$) of the generator lies above the limit value ($U_{PV,max}$) for the input voltage ($U_{PV}$) of the inverter and/or the limit value ($U_{ZWK,max}$) for the link circuit voltage ($U_{ZWK}$).

12. The method as claimed in claim 1, wherein the temperature values ($T_{DCDC}$, $T_{DCAC}$) in the DC-DC converter and/or in the inverter bridge are determined on the basis of temperature models, wherein the temperature models process measurement values of temperature sensors which are assigned to the DC-DC converter and/or to the inverter bridge, and wherein the temperature values ($T_{DCDC}$, $T_{DCAC}$) represent temperatures at or in semiconductor switches of the DC-DC converter and/or of the inverter bridge.

13. An inverter for an energy generating installation, comprising:
an input-side DC-DC converter;
an output-side inverter bridge;
a control device configured to drive the DC-DC converter and the inverter bridge with control signals; and
temperature sensors respectively assigned to the DC-DC converter and to the inverter bridge,
wherein the control device is configured to:

set an input voltage ($U_{PV}$) of the inverter by an input-side DC-DC converter and/or an output-side inverter bridge, wherein the input voltage ($U_{PV}$) corresponds to an MPP voltage ($U_{MPP}$) at which a generator connectable on the input side outputs a maximum electrical power;

determine a first temperature value ($T_{DCDC}$) in the DC-DC converter and a second temperature value ($T_{DCAC}$) in the inverter bridge from the temperature sensors respectively assigned thereto;

change the input voltage ($U_{PV}$) of the inverter with respect to the MPP voltage ($U_{MPP}$) if at least one of the determined temperature values ($T_{DCDC}$, $T_{DCAC}$) exceeds a limit value ($T_{max,DCDC}$, $T_{max,DCAC}$) assigned to the respective temperature values ($T_{DCDC}$, $T_{DCAC}$), wherein to change the input voltage $U_{PV}$), the control device is configured to:

increase the input voltage ($U_{PV}$) with respect to the MPP voltage ($U_{MPP}$) if an exceedance of the limit value ($T_{max,DCDC}$) for the first temperature value ($T_{DCPC}$) in the DC-DC converter is determined and/or the MPP voltage ($U_{MPP}$) lies below a predefined limit voltage ($U_{limit}$); and otherwise reduce the input voltage ($U_{PV}$) with respect to the MPP voltage ($U_{MPP}$).

14. The inverter as claimed in claim 13, further comprising a generator selectively connectable to the inverter on the input side.

15. The inverter as claimed in claim 13, wherein the DC-DC converter is a boost converter.

16. The inverter as claimed in claim 13, wherein the DC-DC converter comprises at least one semiconductor switch and the inverter bridge comprises at least two semiconductor switches.

17. The inverter as claimed in claim 13, wherein the inverter bridge comprises a filter inductance arranged on the output side.

* * * * *